Patented Sept. 11, 1951

2,567,909

UNITED STATES PATENT OFFICE 2,567,909

ALKALI METAL PENTACHLOROPHENATE PELLETS

Fredrick A. Linde, St. Louis, Mo., assignor to Monsanto Chemical Company, St. Louis, Mo., a corporation of Delaware No Drawing. Application June 13, 1949, Serial No. 98,888

7 Claims. (Cl. 260—623)

This invention relates to the alkali metal pentachlorophenates; more specifically, this invention relates to an improved process for the production of alkali metal pentachlorophenate pellets which comprises mixing an alkali metal pentachlorophenate with a small amount of water, and forming the alkali metal pentachlorophenate pellets, which pellets on subsequent drying are characterized by the unusual combination of physical properties of substantially complete absence of any dusting tendencies, yet, extremely rapid rate of solution in water.

The alkali metal pentachlorophenates, and in particular the sodium pentachlorophenate, are extremely versatile compounds. They are water soluble industrial preservatives and fungicides. They find utility in the manufacture of termite-resistant cellulose insulating board and for the preservation of wood, cellulose products, textiles, starches, adhesives, leather, oils, paints, latex and rubber. They are also used in the control of slime and algae, in the formulation of herbicides, as a fermentation disinfectant and for the control of sap stain in green lumber. A chief disadvantage inherent in the use of the alkali metal pentachlorophenates is their tendency to dust. These dusts are very irritating to the mucous membranes producing severe sternutation. These dusts are also quite irritating to the skin. Because of these properties, the physical handling of these materials in their various applications is exceedingly difficult and unpleasant, necessitating extensive protective equipment and clothing. The irritating properties of the alkali metal pentachlorophenates have been reduced to some extent by compressing the product into briquettes. While this procedure does to a certain extent reduce the dusting characteristics, it by no means completely eliminates them. Furthermore, briquetting equipment is exceedingly costly.

It is an object of this invention to provide an improved process for the production of alkali metal pentachlorophenate pellets.

It is also an object of this invention to provide a very simple, practical, inexpensive, and commercially feasible process for the production of alkali metal pentachlorophenate pellets which are substantially free from any dusting tendencies.

Further objects will become apparent from the description of the novel process of this invention and the claims.

It has now been discovered that when a mixture of an alkali metal pentachlorophenate and from about 5% to about 25% by weight of water are mechanically mixed, the alkali metal pentachlorophenate is rolled or formed into substantially spherically shaped pellets of varying sizes, dependent upon the type and time of mixing. It has further been discovered that these pellets, when dried according to any of the commonly used drying procedures well-known to those skilled in the art, are characterized by extreme hardness, negligible dusting tendencies, and yet, extremely rapid solubility in water.

In carrying out the novel process of this invention, an alkali metal pentachlorophenate, such as the sodium or potassium pentachlorophenate, is charged to a container equipped with a suitable mixer and from about 5% to about 25% by weight of total composition of water is added. The composition is mixed until alkali metal pentachlorophenate pellets of the desired size are formed, which pellets are then dried and if desired, classified by screening. The pellets are then ready for packaging and shipping.

It is essential in the novel process of this invention that the water be added to the alkali metal pentachlorophenate rather than in the reverse order. If the alkali metal pentachlorophenate is added to the water, it is exceedingly difficult to obtain uniform mixing.

The alkali metal pentachlorophenate charged need not be dried. Wet alkali metal pentachlorophenate may be used adding sufficient water to bring the total water content within the preferred range. Furthermore, instead of adding water to the alkali metal pentachlorophenate, a solution of the alkali metal pentachlorophenate in water may be added to the alkali metal pentachlorophenate in the mixer in such a quantity that the final water content is within the prescribed range.

This process for the pelleting of alkali metal pentachlorophenates is preferably carried out at or near room temperature, namely, around 25° to about 40° C. Lower temperatures may be utilized as long as the freezing point of water (about 0° C.) is not reached, but such lower temperatures offer no advantage. As the temperature of the mass is increased much above about 40° C., there is a tendency of the material to acquire a pasty consistency, which makes control of the pelleting process under such conditions exceedingly difficult. The exact temperature at which the mass begins to become pasty can not be definitely established, as it is governed to a great extent by the amount of water present, the nature of the mixing equipment and type of mixing. At times, internal friction may cause a rise in temperature during the pelleting process. If this rise in temperature becomes excessive, tending to create a pasty consistency, the temperature of the mass may be reduced to facilitate better control of the pelleting process by any of the convenient methods of cooling or temperature control well-known to those skilled in the art. Typical of such a method of cooling would be the circulation of cooling water around the outside of the particular type of mixer utilized.

Commercial production of alkali metal pentachlorophenates quite frequently results in material containing some free alkali. It has been found that this pelleting process proceeds most favorably with alkali metal pentachlorophenates which are substantially neutral or those with a free alkali content of less than about 2% by weight when expressed as the alkali metal hydroxide. Thus, in the case of sodium pentachlorophenate, sodium pentachlorophenate containing less than about 2% by weight of free alkali expressed as sodium hydroxide is best suited for this pelleting process.

Any of the commonly used types of mixing equipment may be utilized in this process. Typical are ribbon mixers, continuous flight conveyors, drum nodulizers or bakery dough mixers. The time of mixing necessarily must vary with the size of the batch, type of mixer utilized and size of pellet desired. Longer mixing periods produce larger and more compact pellets. According to the novel process of this invention, it is possible to prepare pellets which will vary in size from those that will pass through a standard 25-mesh screen to pellets 2" to 3" in diameter.

After mixing, the wet pellets may be dried in any of the conventional drying equipment. Typical of such equipment are tray driers, cabinet driers, vacuum driers, continuous tunnel driers, tumbler driers or even infra-red radiation. Temperature of drying is not critical and is dictated by the type of drying equipment utilized. For example, these pellets may be dried at 110° C. at atmospheric pressure or at lower temperatures under reduced pressure.

The following example is illustrative of the novel process of this invention:

A 4'x8' ribbon mixer was charged with 1,500 lbs. of sodium pentachlorophenate. To this was added about 245 lbs. of water while continuously mixing the batch. When pellets of the desired size had been formed, the entire charge was transferred to a tray drier and dried at 110° C. The total elapsed time for charging, mixing and discharging the mixer was about three hours. After drying, the pellets were classified by screening through a standard 3-mesh screen and a standard 25-mesh screen. 60% of the material passed the 3-mesh screen and was retained on the 25-mesh screen. These pellets were packaged for shipping. Those pellets which did not pass the 3-mesh screen and those which passed the 25-mesh screen, were recycled.

The following table contains a comparison of the physical properties of alkali metal pentachlorophenate pellets prepared by the novel process of this invention with the physical properties of alkali metal pentachlorophenate pellets or briquettes, as prepared according to methods heretofore used. In this table the column entitled "Pellets" sets forth the physical properties of pellets prepared in the preceding example, and the column entitled "Briquettes" sets forth the physical properties of sodium pentachlorophenate briquettes prepared by compressing a cylindrical pad of dry sodium pentachlorophenate, 1⅝" in diameter and 2" high under a total force of 20,000 lbs. into a briquette 1⅝" in diameter and ½" thick.

*Sodium pentachlorophenate*

| Test | Pellets | Briquettes |
| --- | --- | --- |
| Apparent Specific Gravity | 1.0 | 1.85. |
| Solution rate: Amount of water to dissolve 25 g. in indicated volume of flowing water. | 430 ml | 1,450 ml. |
| Time to dissolve 50 g. in 500 ml. of stirred water. | 6½ min | 55 min. |
| Exposure to 100% relative humidity for 2 hours. | no effect | surface softens. |
| Friability—Shaking 10 min. | 0.5% dust formed | 31% dust formed. |
| Break test—5 ft. drop | 0% break | 100% break. |

The physical properties set forth in the above table are indicative of the outstanding, unusual and unpredictable physical properties of alkali metal pentachlorophenates prepared by the novel process of this invention. The exceptional hardness of these pellets is shown by the fact that no physical change was noted on exposure of these pellets to 100% relative humidity for 2 hours, only 0.5% dust was formed on shaking them for 10 minutes in the friability test, and no fractures whatsoever occurred in the break test, whereas the sodium pentachlorophenate briquettes softened on a similar exposure to 100% relative humidity for 2 hours disintegrated into 31% dust when subjected to the same friability test, and were completely fractured when subjected to the break test. These results are indicative of the extreme hardness and lack of dusting tendencies of the novel alkali metal pentachlorophenate pellets of this invention. However, in spite of this extreme hardness, these pellets have an exceedingly higher rate of solution in water than are the briquettes, as indicated by the above described time required to dissolve a specified amount in water and the amount of flowing water required to dissolve a specified amount of the pellets and briquettes.

What is claimed is:

1. A process for the production of alkali metal pentachlorophenate pellets, which comprises adding water to an alkali metal pentachlorophenate in the amount of from about 5% to about 25% by weight based on total composition, then mixing to form alkali metal pentachlorophenate pellets and then drying said pellets.

2. The process as described in claim 1 wherein the alkali metal pentachlorophenate is sodium pentachlorophenate.

3. A process for the production of alkali metal pentachlorophenate pellets, which comprises adding water to an alkali metal pentachlorophenate containing less than 2% by weight of free alkali, expressed as the hydroxide of said alkali metal, in the amount of from about 5% to about 25% by weight based on total composition, then mixing to form alkali metal pentachlorophenate pellets and then drying said pellets.

4. The process as described in claim 3 wherein the alkali metal pentachlorophenate is sodium pentachlorophenate.

5. A pelleted alkali metal pentachlorophenate formed by adding water to an alkali metal pentachlorophenate in the amount of from about 5% to about 25% by weight based on total composition, then mixing to form alkali metal pentachlorophenate pellets and then drying said pellets.

6. A pelleted alkali metal pentachlorophenate formed by adding water to an alkali metal pentachlorophenate, containing less than about 2% by weight of free alkali, expressed as the hydroxide of said alkali metal, in the amount of from about 5% to about 25% by weight based on total composition, then mixing to form alkali metal pentachlorophenate pellets and then drying said pellets.

7. The alkali metal pentachlorophenate pellets described in claim 6, wherein the alkali metal pentachlorophenate is sodium pentachlorophenate.

FREDRICK A. LINDE.

REFERENCES CITED

The following references are of record in the file of this patent:

UNITED STATES PATENTS

| Number | Name | Date |
| --- | --- | --- |
| 2,188,944 | Fox et al. | Feb. 6, 1940 |